H. A. BRISCO.
WATER TUBE BOILER.
APPLICATION FILED NOV. 30, 1915.
1,285,010.
Patented Nov. 19, 1918.
3 SHEETS—SHEET 2.
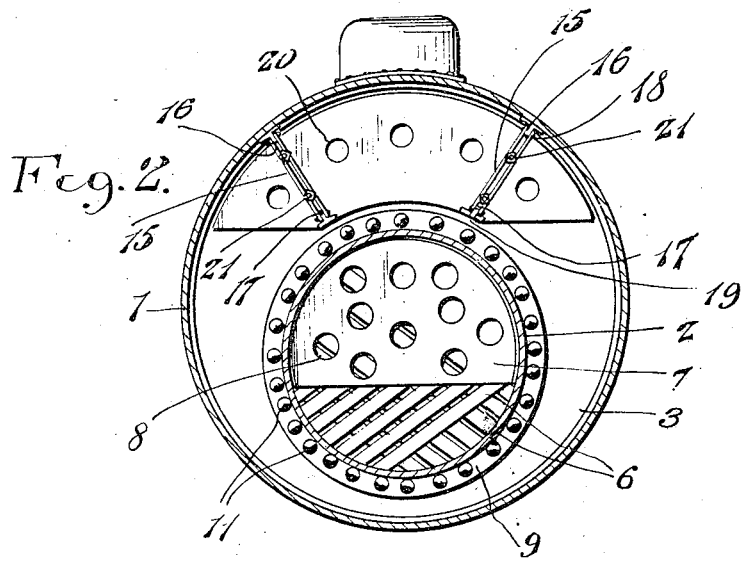
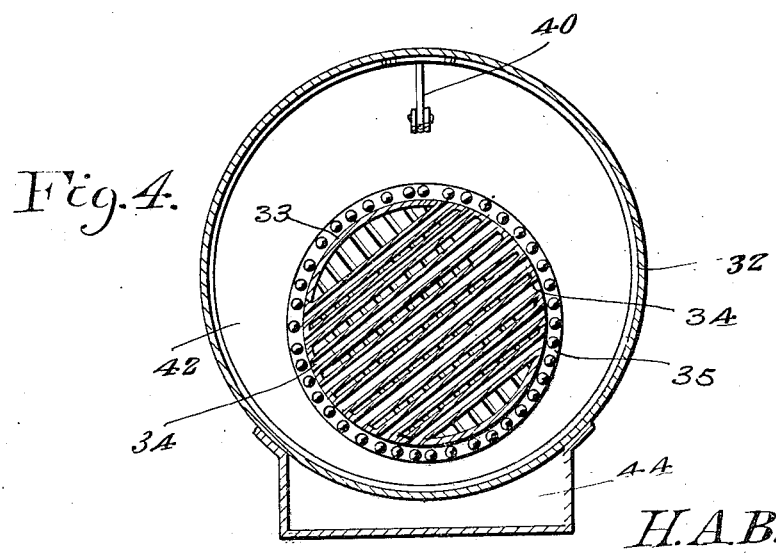
Inventor
H. A. Brisco

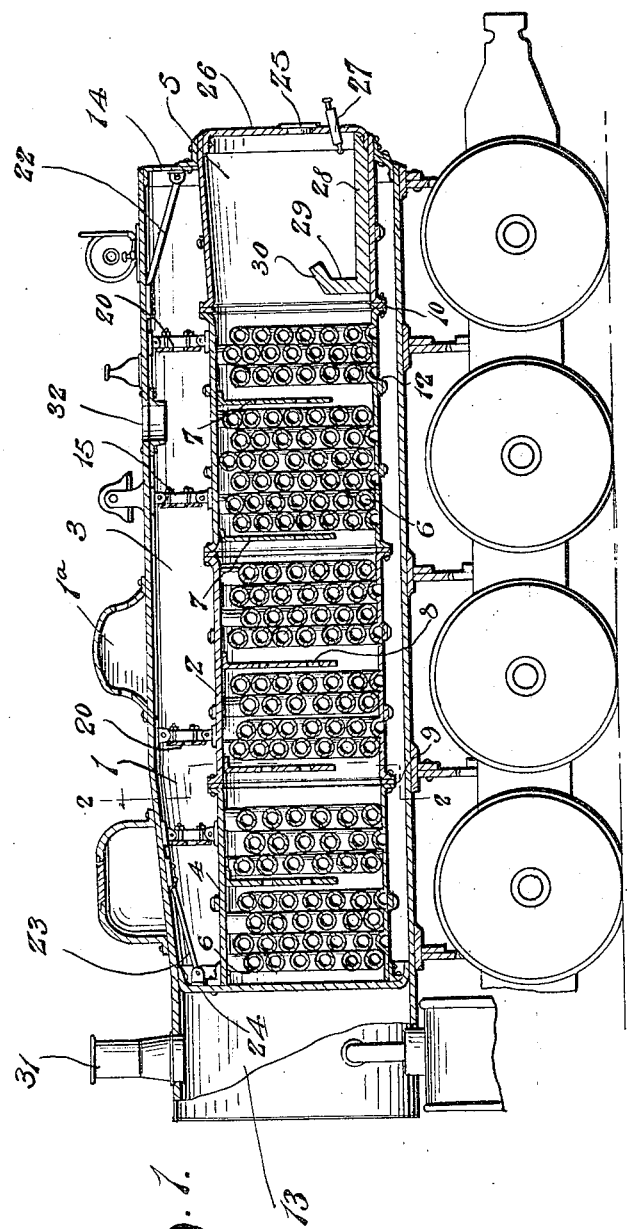

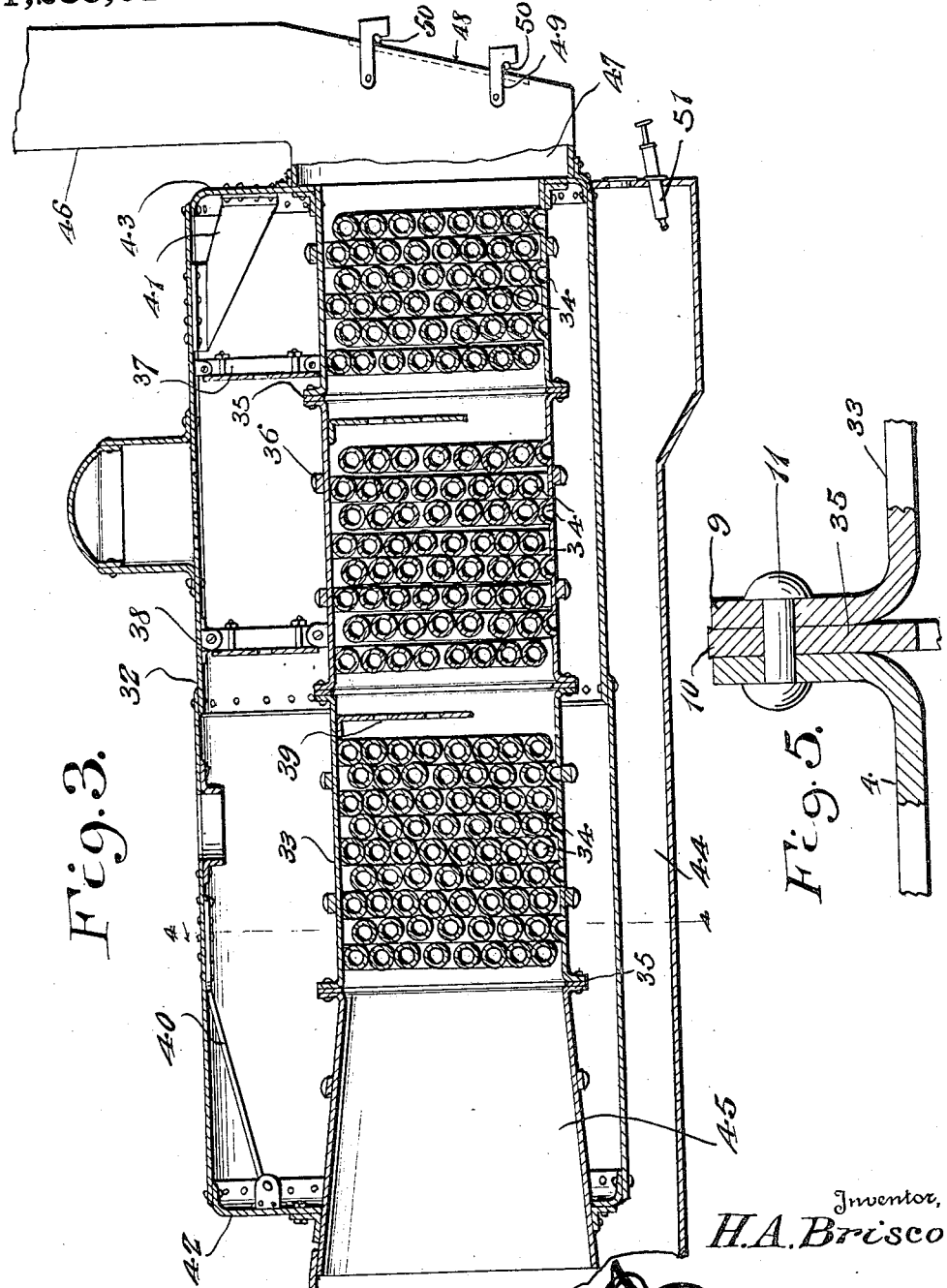

UNITED STATES PATENT OFFICE.

HYLTON A. BRISCO, OF FRESNO, CALIFORNIA, ASSIGNOR OF TWO-THIRDS TO DIXON L. PHILLIPS, OF OAKLAND, CALIFORNIA.

WATER-TUBE BOILER.

1,285,010.  Specification of Letters Patent.  Patented Nov. 19, 1918.

Application filed November 30, 1915. Serial No. 64,292.

*To all whom it may concern:*

Be it known that I, HYLTON A. BRISCO, a citizen of the United States, residing at Fresno, in the county of Fresno and State of California, have invented certain new and useful Improvements in Horizontal Water-Tube Boilers for Locomotives, Marine and Stationary Engines; and I do hereby declare the following to be a full, clear, and exact description of the invention, such as will enable others skilled in the art to which it appertains to make and use the same.

The invention relates to improvements in water tube boilers.

The object of the present invention is to improve the construction of water tube boilers and to provide a simple, practical and comparatively inexpensive horizontal water tube boiler designed for use on locomotives, steamships, and in stationary plants and adapted to afford an increase in the production of steam.

A further object of the invention is to provide a boiler of this character equipped with means for deflecting the products of combustion for affording a better distribution of the heat in the furnace and provided also with means for preventing the water in the boiler from flowing back and forth and splashing into the steam dome and dry steam tubes.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Figure 1 is a longitudinal sectional view of a horizontal water tube boiler constructed in accordance with this invention and designed for use on a locomotive, Fig. 2 is a transverse sectional view on the line 2—2 of Fig. 1, Fig. 3 is a longitudinal sectional view of a horizontal water tube boiler designed for use on steamships and stationary plants.

Fig. 4 is a transverse section on the line 4—4 of Fig. 3,

Fig. 5 is a detail view illustrating the construction of the expansion ring.

Like numerals of reference designate corresponding parts in the several figures of the drawings.

In the accompanying drawings, in which is illustrated the preferred embodiment of the invention, the horizontal water tube boiler comprises in its construction an outer shell 1, and an inner shell 2 arranged in spaced relation with the outer shell to form a water space 3 surrounding the inner shell 2. The inner shell 2 is composed of a plurality of substantially cylindrical sections 4 and a furnace section 5, the sections 4 being provided with sets of water tubes 6 which are disposed transversely of the inner shell. Each set of water tubes consists of a plurality of parallel inclined tubes arranged in spaced relation and extending entirely across the inner shell and communicating at their ends with the intervening water space between the inner and outer shells. The sets of water tubes are oppositely inclined and as they are arranged in the path of the products of combustion, the water in the water tubes will be highly heated and a boiler of maximum steam capacity will result. The water tubes serve to deflect the products of combustion which are further deflected by inner substantially segmental baffle plates 7 arranged at intervals throughout the inner shell and extending across the upper portion thereof and provided with openings 8 for the passage of the products of combustion. The baffle plates 7 may be of any desired size and they preferably extend from the top of the inner shell to a point below the center thereof as shown. The sections of the inner shell are provided with flanges 9 and expansion rings 10 are secured between the flanges 9 by rivets 11 or other suitable fastening devices. The expansion rings are adapted to compensate for the contraction and expansion of the inner shell and they provide a water tight corking for the sections at the joints thereof.

The sections of the inner shell are also preferably equipped with reinforcing rings 12 mounted on the exterior of the inner shell and surrounding the same and secured thereto by suitable fastening devices.

The boiler is provided at the front with a smoke box 13 and the furnace section 5 at the opposite end of the boiler is tapered as shown and the opening in the boiler head 14 in which the outer end of the tapered furnace section is secured is of sufficient size to permit the expansion rings and the reinforcing rings of the inner shell to clear the said head in introducing the parts into the outer shell. The inner shell is supported by suspension braces 15 consisting of bars arranged in pairs and secured at their upper and lower ends to lugs 16 and 17 of attaching plates 18 and 19 and the suspension braces diverge upwardly at opposite sides of the center of the top of the inner shell and are adapted to prevent oscillation of the inner shell within the outer shell. The suspension braces also support upper whirl breaking baffle plates 20 of segmental form extending across the top of the space 3 between the inner and outer shells and secured to the suspension braces 15 by suitable fastening devices 21 which pass between the pairs of bars of the said braces. The upper baffle plates are adapted to prevent the water from flowing back and forth in the said space 3 and splashing into the steam dome and the dry steam pipes, not shown.

The boiler is also provided with inclined braces 22 and 23 connecting the shell with the head 14 and with the head 24 at the opposite end of the boiler.

The furnace section 5 which has a fire door 25 in its vertical wall 26 is equipped with oil burners 27 and it is provided with a bottom wall 28 and a front fire wall 29 constructed of fire brick or other refractory material and the fire wall 29 has an inclined portion 30 extending upwardly and rearwardly with respect to the locomotive, but this construction may be varied and other fuel can of course be employed. The products of combustion pass through the inner shell to the smoke box 13 and escape at the smoke stack 31.

The outer shell is equipped at the top with a man hole 32 and it has the usual boiler accessories common to locomotives as illustrated in Fig. 1 of the drawings.

In Figs. 3 and 4 of the drawings is illustrated another form of the invention which is designed for use on steam vessels and various other place. The boiler shown in Figs. 3 and 4 comprises an outer shell 32, an inner shell 33 constructed substantially the same as that heretofore described. The inner shell which is sectional is equipped with water tubes 34 and it is provided with expansion rings 35 and reinforcing rings 36. It is suspended by diverging braces 37 which are adapted to support upper baffle plates 38, lower or inner baffle plates 39 being also provided for deflecting the products of combustion to secure a more thorough distribution of the heat and the said products of combustion passing through the inner shell. Inclined braces 40 and 41 are also employed for connecting the outer shell with the heads 42 and 43. The boiler is equipped with a furnace section 44 extending below the boiler the entire length thereof from one end of the same to the other end of the boiler and communicating with the end section 45 which is tapered to fit an enlarged opening in the head 42. The products of combustion pass along the under side of the boiler through the furnace section 44 to the tapered end section 45 of the inner shell and it traverses the same to a smoke stack 46 extending upwardly from a smoke box 47. The smoke box 47 is provided with a door 48 secured in its closed position by latches 49 engaging projections 50 of the inclined door 48. The furnace section 44 is equipped with oil burners 51 but other fuel may of course be employed.

What is claimed is:—

1. A horizontal water tube boiler comprising inner and outer spaced cylindrical shells defining a water space between the same, a plurality of spaced sets of transversely extending water tubes arranged in the inner shell and communicating with the water space, and perforated heat deflecting plates arranged between each set of water tubes and extending from the upper surface of the inner shell to a point below the center thereof, as and for the purpose specified.

2. A horizontal water tube boiler comprising inner and outer spaced cylindrical shells defining a water space between the same, a plurality of spaced sets of transversely extending water tubes arranged in the inner shell and communicating with the water space, suspension braces extending from the upper inner surface of the outer shell to the upper surface of the inner shell and supporting the inner shell in spaced relation to the outer shell, and perforated arcuate baffle plates bolted to the suspension braces and extending across the water space, as and for the purpose specified.

In testimony whereof I affix my signature in presence of two witnesses.

HYLTON A. BRISCO.

Witnesses:
EDWARD F. PETERS,
EMMA G. PARSONS.

Copies of this patent may be obtained for five cents each, by addressing the "Commissioner of Patents, Washington, D. C."